Figures 1, 2:
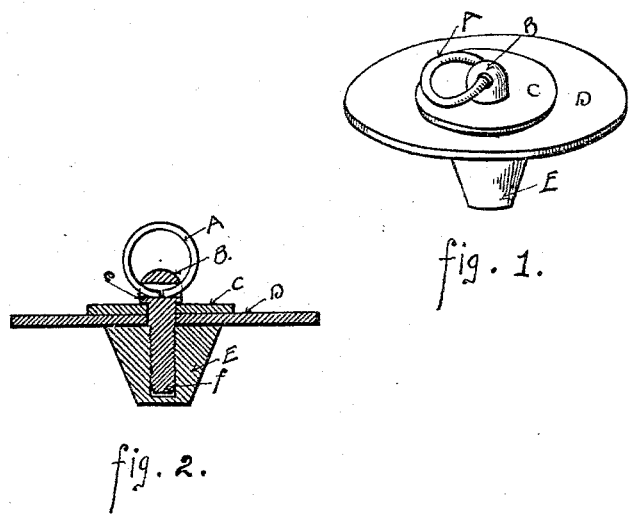

(No Model.)

J. N. CRABB.
STOPPER FOR WASHBASINS AND BATH TUBS.

No. 559,845. Patented May 12, 1896.

Witnesses;
Wm. Froendhoff.
Charles Igelman.

Inventor;
James N. Crabb

UNITED STATES PATENT OFFICE.

JAMES N. CRABB, OF INDIANAPOLIS, INDIANA.

STOPPER FOR WASHBASINS AND BATH-TUBS.

SPECIFICATION forming part of Letters Patent No. 559,845, dated May 12, 1896.

Application filed February 18, 1895. Serial No. 539,163. (No model.)

*To all whom it may concern:*

Be it known that I, JAMES N. CRABB, a citizen of the United States, residing at Indianapolis, in the county of Marion and State of Indiana, have invented certain new and useful Improvements in Washbasin and Bath-Tub Stoppers, of which the following is a specification.

My invention relates to improvements in stoppers for washbasins or other vessels having an outlet in bottom for the purpose of draining said vessel and intended to hold water by closing said outlet.

The objects of my invention are to provide a stopper for washbasins which, on account of its valve principle and suction, is easily adjusted and cannot be upset or misplaced by a light stroke, like common stoppers or plugs. Said plugs or common stoppers are all made in several different sizes in order to exactly fit in the various-sized outlets of the several kinds of vessels.

While my stopper, made in two sizes, will fit, cover, and close outlets of different sizes ranging from the smallest washbasin-outlets to the largest bath-tub outlets, therefore one size of my stopper will fit several-sized outlets of the various kinds of vessels now in use, at the same time making it simple, durable, and applicable to various kinds of washbasins and bath-tubs now in general use.

The invention comprises a series of sectional parts, which consist of a rubber disk of suitable size for covering the orifice in vessel, having metal (which may be covered with rubber if necessary) secured to each side of said rubber disk by means of a bolt passing through a washer, then through said rubber disk, and then screwed into a conical-shaped tap, as illustrated in the accompanying drawings, in which—

Figure 1 is a perspective view of the stopper complete. Fig. 2 is a vertical section showing the simple construction of the same.

Similar letters refer to similar parts in the two views.

In the drawings, A represents a ring attached to the head of bolt B. Said bolt B, having a shouder *e* and threaded portion *f*, passes through washer C and rubber disk D and screws into conical tap E, thereby forming the stopper complete and ready for use.

With reference to Fig. 2 of the drawings it will be seen that washer C is somewhat larger in diameter than the larger portion of conical tap E, which feature prevents the edges of either washer C or conical tap E from cutting rubber disk D. By securing the different parts by means of a screw-bolt B, screwed into the conical tap E, any part thereof may be replaced with a new part, should it become necessary from actual wear or breakage.

Rubber disks two inches in diameter are well adapted to operate and close outlets ranging in size from three-quarters of an inch to one and one-quarter inch in diameter.

I do not claim a plug such as are commonly used, which perform their duty by plugging the outlet. All such plugs or stoppers must be tediously adjusted and are liable to become set in or get clear down through the outlet, causing considerable inconvenience and often rendered worthless by the act of removing the same, while my invention, valve-like and guided by the conical tap, will adjust itself when dropped into any ordinary washbasin, and by weight and suction will firmly close the outlet by simply covering the same without plugging it up, thereby obviating the danger of getting the stopper fast, also overcoming various objections to all common stoppers or plugs now in use.

In operation all that is required is to simply drop this stopper over the outlet of basin, the conical tap E dropping loosely into the orifice of the basin, when the rubber disk D, which is of sufficient size in diameter to project over the edge of orifice, and adhering to a portion of the surface of the bottom of basin on the valve principle, will firmly close said orifice, rendering said basin perfectly watertight.

This device will do the work required to perfection, let the outlet be either round or square, and it cannot be easily misplaced except by lifting the same, by means of a chain or otherwise, out of position when it is desired to drain the vessel being used.

I deem the foregoing explanation sufficiently plain that the improvements will be readily understood by all conversant with such matters, the extreme simplicity rendering an elaborate description unnecessary.

Having thus described my invention, what I claim, and desire to secure by Letters Patent, is—

In a stopper for washbasins, the combination with a tapering guide constructed to loosely engage the outlet-passage from the basin, of a flexible disk, having a diameter considerably greater than that of the guide, suitable fastening devices for securing the disk upon the top of the guide, and concentrically therewith, whereby the stopper may be with facility placed in position over the outlet-passage which is then closed by the flexible disk irrespective of the precise position of the guide, substantially as described.

JAMES N. CRABB.

Witnesses:
WILLIAM A. BOND,
NUTE BRUNFIEL.